United States Patent
Choi et al.

(10) Patent No.: US 11,448,776 B2
(45) Date of Patent: Sep. 20, 2022

(54) METHOD OF PROVIDING LOCATION INFORMATION TO EXTERNAL ELECTRONIC DEVICE AND ELECTRONIC DEVICE FOR SUPPORTING SAME

(71) Applicant: Samsung Electronics Co., Ltd., Suwon-si (KR)

(72) Inventors: Kyonggon Choi, Suwon-si (KR); Yunwoo Lee, Suwon-si (KR); Huntaek Han, Suwon-si (KR); Jongho Kim, Suwon-si (KR); Sungjung Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 16/663,126

(22) Filed: Oct. 24, 2019

(65) Prior Publication Data
US 2020/0132863 A1    Apr. 30, 2020

(30) Foreign Application Priority Data
Oct. 24, 2018    (KR) .................... 10-2018-0127493

(51) Int. Cl.
*G01S 19/44*    (2010.01)
*G01S 19/04*    (2010.01)
(Continued)

(52) U.S. Cl.
CPC .............. *G01S 19/44* (2013.01); *G01S 19/04* (2013.01); *G01S 19/071* (2019.08); *G01S 19/41* (2013.01)

(58) Field of Classification Search
CPC ........ G01S 19/04; G01S 19/071; G01S 19/41; G01S 19/43; G01S 19/44
See application file for complete search history.

(56) References Cited

U.S. PATENT DOCUMENTS 7,400,294 B2    7/2008    Whitehead et al.
8,169,364 B2    5/2012    Wirola et al.
(Continued)

FOREIGN PATENT DOCUMENTS

JP    2009-063445 A    3/2009
JP    2015-075380 A    4/2015
(Continued)

OTHER PUBLICATIONS

English translation of JP-2015075380-A (Year: 2022).*
(Continued)

*Primary Examiner* — Bernarr E Gregory
*Assistant Examiner* — Fred H Mull

(57) ABSTRACT

A movable electronic device for providing location information to an external electronic device includes: at least one sensor; a satellite-positioning circuit; a communication interface; and a processor functionally connected to the at least one sensor, the satellite-positioning circuit, or the communication interface. The processor is configured to identify that the electronic device is in a fixed state, identify whether a predetermined time elapses from the identification based on the identification, determine absolute coordinates of an area in which the electronic device positioned using a plurality of signals received from at least one satellite for the predetermined time from the identification based on identification of the elapse of the predetermined time, and transmit information on the determined absolute coordinates to the external electronic device. The transmitted information on the absolute coordinates is used to determine absolute coordinates of an area in which the external electronic device is positioned by the external electronic device.

20 Claims, 11 Drawing Sheets

(51) Int. Cl.
*G01S 19/41* (2010.01)
*G01S 19/07* (2010.01)

(56) References Cited

U.S. PATENT DOCUMENTS

| | | | |
|---|---|---|---|
| 2010/0255781 A1* | 10/2010 | Wirola | G01S 19/34 |
| | | | 455/41.2 |
| 2011/0285587 A1* | 11/2011 | Vollath | G01S 19/04 |
| | | | 342/357.62 |
| 2013/0293412 A1* | 11/2013 | Appleford | G01S 19/43 |
| | | | 342/357.23 |
| 2015/0057871 A1 | 2/2015 | Ono et al. | |
| 2018/0031711 A1* | 2/2018 | Cash | G01S 19/43 |
| 2018/0120445 A1 | 5/2018 | Dill | |
| 2018/0306929 A1* | 10/2018 | Park | G01S 19/07 |

FOREIGN PATENT DOCUMENTS

| | | | |
|---|---|---|---|
| JP | 2015075380 A * | 4/2015 | |
| KR | 10-0898993 B1 | 5/2009 | |
| KR | 10-2016-0008785 A | 1/2016 | |
| WO | 2011116400 A1 | 9/2011 | |

OTHER PUBLICATIONS

ISA/KR, International Search Report and Written Opinion of the International Searching Authority, International Application No. PCT/KR2019/014074, dated Feb. 11, 2020, 11 pages.

\* cited by examiner

METHOD OF PROVIDING LOCATION INFORMATION TO EXTERNAL ELECTRONIC DEVICE AND ELECTRONIC DEVICE FOR SUPPORTING SAME

CROSS-REFERENCE TO RELATED APPLICATION

This application is based on and claims priority under 35 U.S.C. 119 to Korean Patent Application No. 10-2018-0127493, filed on Oct. 24, 2018, in the Korean Intellectual Property Office, the disclosure of which is herein incorporated by reference in its entirety.

BACKGROUND

1. Field

The disclosure relates to a method by which an electronic device provides location information to an external electronic device and an electronic device for supporting the same.

2. Description of Related Art

An electronic device may receive a signal from a satellite and identify a location of the electronic device. The electronic device may transmit the location of the electronic device to an external electronic device so that the external electronic device identifies a location of the external electronic device.

The above information is presented as background information only to assist with an understanding of the disclosure. No determination has been made, and no assertion is made, as to whether any of the above might be applicable as prior art with regard to the disclosure.

SUMMARY

In order to provide information for identifying a location of an external electronic device to the external electronic device, a fixed reference station may be needed. Many fixed reference stations may be required to provide information for identifying the accurate location. Accordingly, there may be a need for a method of using a movable electronic device as a reference station.

The technical subjects pursued in the disclosure may not be limited to the above mentioned technical subjects, and other technical subjects which are not mentioned may be clearly understood, through the following descriptions, by those skilled in the art of the disclosure.

In accordance with a movable electronic device for providing location information to an external electronic device is provided. The electronic device includes: at least one sensor configured to detect motion of the electronic device; a satellite-positioning circuit; a communication interface; and a processor functionally connected to the at least one sensor, the satellite-positioning circuit, or the communication interface, wherein the processor is configured to identify that the electronic device is in a fixed state, identify whether a predetermined time elapses from the identification, based on the identification, determine absolute coordinates of an area in which the electronic device positioned using a plurality of signals received from at least one satellite for the predetermined time from the identification, based on identification of the elapse of the predetermined time, and transmit information on the determined absolute coordinates to the external electronic device, and the transmitted information on the absolute coordinates is used to determine absolute coordinates of an area in which the external electronic device is positioned by the external electronic device.

In accordance with another aspect of the disclosure, a movable electronic device for providing location information to an external electronic device is provided. The electronic device includes: at least one sensor configured to detect motion of the electronic device; a satellite positioning circuit; a communication interface; and a processor functionally connected to the at least one sensor, the satellite positioning circuit, or the communication interface, wherein the processor is configured to identify that the electronic device is in a fixed state through the at least one sensor, identify whether the electronic device is positioned at a predetermined location through the at least one sensor, based on the identification, acquire information on absolute coordinates of an area in which the electronic device is positioned based on a plurality of signals received from satellites for a first time from timing at which it is determined that the electronic device is in the fixed state, based on identification of the predetermined location of the electronic device, acquire the information on the absolute coordinates of the area in which the electronic device is positioned based on a plurality of signals received from satellites for a second time, which is longer than the first time, from timing at which it is identified that the electronic device is in the fixed state, based on identification of a location of the electronic device different from the predetermined location and transmit the acquired information on the absolute coordinates.

In accordance with another aspect of the disclosure, a method by a movable electronic device for providing location information to an external electronic device is provided. The method includes: identifying that the electronic device is in a fixed state through the at least one sensor; identifying whether a predetermined time elapses from the identification, based on the identification; determining absolute coordinates of an area in which the electronic device is positioned using a plurality of signals received from at least one satellite for the predetermined time from the identification, based on identification of the elapse of the predetermined time; and transmitting information on the determined absolute coordinates to the external electronic device, wherein the transmitted information on the absolute coordinates is used to determine absolute coordinates of an area in which the external electronic device is positioned by the external electronic device.

With respect to an electronic device for providing location information to an external electronic device and a method of operating the same according to various embodiments, a movable electronic device can serve as a reference station. The movable electronic device can provide information absolute coordinates of the electronic device to determine absolute coordinates of the external electronic device to the external electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
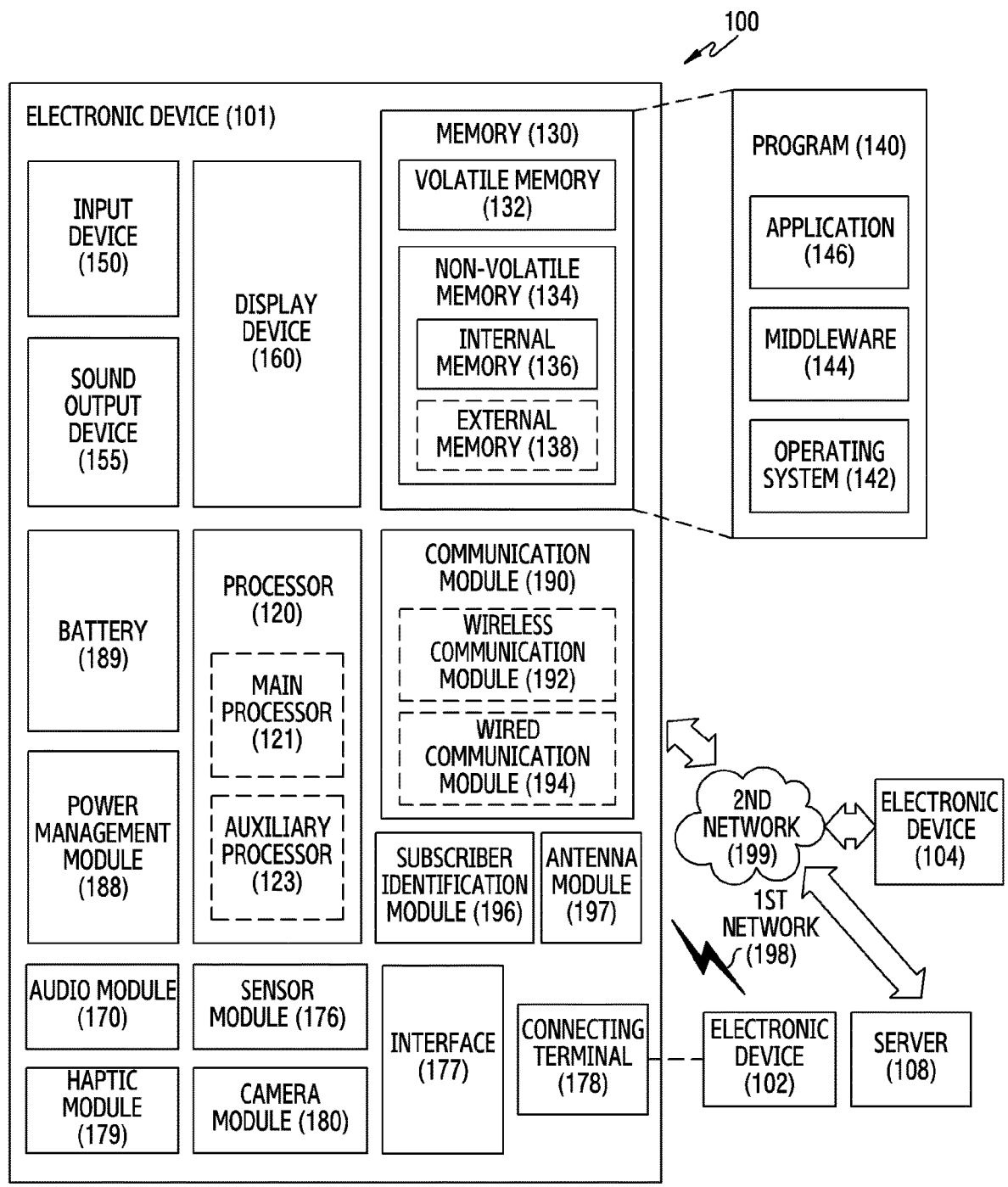
FIG. 1 is a block diagram illustrating an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module_(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
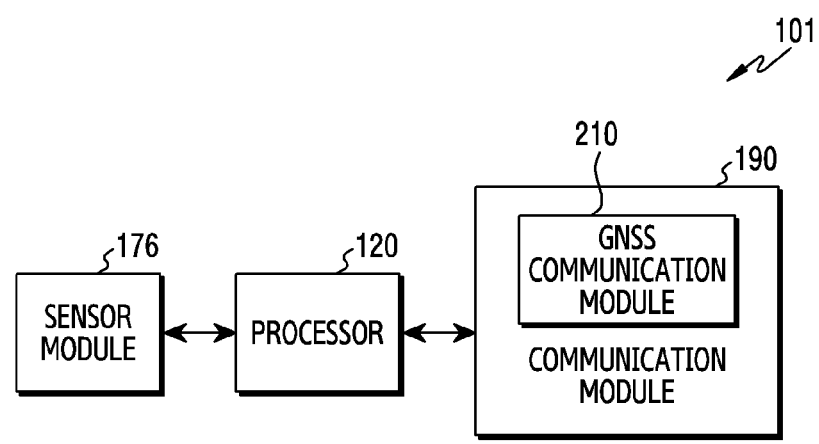
FIG. 2 illustrates an example of a functional configuration of an electronic device for transmitting information on absolute coordinates to an external electronic device according to various embodiments.

FIG. 2 illustrates an example of a functional configuration of an electronic device for transmitting information on absolute coordinates to an external electronic device according to various embodiments. At least some of the functional configuration illustrated in FIG. 2 may be included in the electronic device 101 illustrated in FIG. 1.

Referring to FIG. 2, the electronic device 101 may include a processor 120, a sensor module 176, and a communication module 190. However, the disclosure is not limited thereto, and some elements may be omitted.

According to an embodiment, the communication module 190 may include a global navigation satellite system (GNSS) communication module 210.

The GNSS communication module 210 may transmit and receive a GNSS signal. The GNSS may include, for example, at least one of a Global Positioning System (GPS), a Global navigation satellite system (Glonass), a Beidou Navigation satellite system (hereinafter, referred to as "Beidou"), Quasi-Zenith Satellite System (QZSS), Indian Regional Satellite System (IRNSS), and Galileo (the European Global satellite-based navigation system) according to a place of usage, a bandwidth, or the like. Hereinafter, in the disclosure, the "GPS" may be interchangeably used with the "GNSS". According to an embodiment, the GNSS communication module 210 may receive satellite signal information (for example, PRN code or Doppler information) from a plurality of satellites.

According to an embodiment, the communication module 190 may receive corrected data from a fixed reference state using a Real Time Kinematics (RTK)-GNSS. According to an embodiment, the communication module 190 may receive corrected data from a mobile reference station. The corrected data may include information on absolute coordinates of the mobile reference station. According to an embodiment, the electronic device 101 may serve as the mobile reference station. The processor 120 of the electronic device 101 may transmit information on absolute coordinates to an external electronic device through the communication module 190. According to an embodiment, the processor 120 of the electronic device 101 may transmit information on absolute coordinates of the electronic device 101 to an external electronic device in the form of a Radio Technical Commission for Maritime Services (RTCM) message (for example, RTCM 3). The external electronic device may receive information on absolute coordinates from the electronic device 101. The external electronic device may identify absolute coordinates of the external electronic device on the basis of the received information on the absolute coordinates. According to an embodiment, the external electronic device may include a server 108. The server 108 may transmit information on the absolute coordinates of the electronic device 101 to another external electronic device. According to an embodiment, the information on the absolute coordinates may include RTK correction data. According to an embodiment, the information on the absolute coordinates may include a pseudo range or a carrier phase.

According to an embodiment, the sensor module 176 may acquire information for identifying motion of the electronic device 101. According to an embodiment, the sensor module 176 may include a motion sensor for identifying motion of the electronic device 101. According to an embodiment, the sensor module 176 may acquire information for identifying whether the electronic device 101 is fixed. According to an embodiment, the sensor module 176 may acquire information for identifying whether the electronic device 101 is positioned at a predetermined location. According to an embodiment, the sensor module 176 may transmit acquired information to the processor 120. According to an embodiment, the sensor module 176 may include at least one of an acceleration sensor (accelerometer), a gyro sensor (gyroscope), an odometer, or a direction sensor.

According to an embodiment, the processor 120 may control, for example, the overall operation of the electronic device 101. According to an embodiment, the processor 120 may be operatively coupled with other elements within the electronic device 101 such as the sensor module 176 or the communication module 190 in order to control the overall operation of the electronic device 101. According to an embodiment, the processor 120 may receive commands of other elements (for example, the sensor module 176 or the communication module 190). The processor 120 may analyze the received command. The processor 120 may perform calculations and process data according to the analyzed command. The processor 120 may be implemented in software or in hardware such as a chip or a circuitry, or may be implemented as a combination of software and hardware. The processor 120 may be one or a combination of a plurality of processors.

According to an embodiment, the processor 120 may analyze a message, data, an instruction, or a signal received from the sensor module 176 or the communication module 190. The processor 120 may process the message, data, instruction, or signal received from the sensor module 176 or the communication module 190. The processor 120 may generate a new message, data, instruction, or signal based on received message, data, instruction, or signal. The processor 120 may provide the processed or generated message, data, instruction, or signal to the sensor module 176 or the communication module 190.

According to an embodiment, the processor 120 may identify whether the electronic device 101 is fixed using information acquired through the sensor module 176. For example, the processor 120 may identify whether the electronic device 101 is fixed on the basis of information indicating that a value included in information acquired through the sensor module 176 constantly remains or changes within a range smaller than a predetermined size for a predetermined time.

According to an embodiment, the processor 120 may identify whether the predetermined time elapses. The processor 120 may receive a satellite signal through the GNSS communication module 210 for the predetermined time while the electronic device 101 is fixed. According to an embodiment, the processor 120 may identify an intensity of a signal for each of a plurality of satellites according to a satellite array (constellation) through the GNSS communication module 210. The processor 120 may identify at least one satellite that transmits a signal having a predetermined size or larger. According to an embodiment, the processor 120 may determine the predetermined time on the basis of a use history of the electronic device 101. For example, when the electronic device 101 is fixed to a predetermined location, the processor 120 may change the predetermined time to be shorter.

According to an embodiment, the processor 120 may determine absolute coordinates of the electronic device 101. The processor 120 may make a request for precise orbit information of at least one satellite or satellite clock information to an International GNSS Service (IGS). The processor 120 may receive precise orbit information or satellite clock information from the IGS. The processor 120 may determine absolute coordinates of the electronic device 101 on the basis of the satellite signal, the precise orbit information, or the satellite clock information received through the GNSS communication module 210 for the predetermined time while the electronic device 101 is fixed. The absolute coordinates of the electronic device 101 may include information on longitude and latitude or degree/minute/second coordinates of the electronic device 101. According to an embodiment, the processor 120 may receive a satellite signal for a predetermined time and estimate an ambiguity parameter. The processor 120 may determine absolute coordinates of the electronic device 101 through the ambiguity parameter. According to an embodiment, the processor 120 may determine absolute coordinates of the electronic device 101 through Precise Point Positioning (PPP). According to an embodiment, the absolute coordinates may be a location having a margin of error in units of cm from the actual location.

According to an embodiment, the processor 120 may transmit information on the absolute coordinates of the electronic device 101 to an external electronic device. The processor 120 may transmit the information on the absolute coordinates of the electronic device 101 to the external electronic device through a RTCM standard (for example, RTCM 2.1). According to an embodiment, the information on the absolute coordinates of the electronic device 101 may include RTK correction information (data). According to an embodiment, the information on the absolute coordinates of the electronic device 101 may include a pseudo range or a carrier phase.

The elements within the electronic device 101 illustrated in FIG. 2 may be used to implement the operation of the electronic device 101 described below with reference to FIGS. 3A to 10. At least some of the elements within the electronic device 101 illustrated in FIG. 2 may be integrated or omitted depending on the design of the electronic device 101 according to various embodiments. Further, elements other than the elements within the electronic device 101 illustrated in FIG. 2 may be used by the electronic device 101 depending on the design of the electronic device 101 according to various embodiments.

A movable electronic device (for example, the electronic device 101) for providing location information to an external electronic device (for example, the external electronic device 601) may include least one sensor (for example, the sensor module 176) configured to detect motion of the electronic device, a satellite-positioning circuit (for example, the GNSS communication module 210), a communication interface (for example, the communication module 190), and a processor (for example, the processor 120) functionally connected to the at least one sensor, the satellite-positioning circuit, or the communication interface, wherein the processor is configured to identify that the electronic device is in a fixed state, identify whether a predetermined time elapses from the identification, based on the identification, determine absolute coordinates of an area in which the electronic device positioned using a plurality of signals received from at least one satellite for the predetermined time from the identification, based on identification of the elapse of the predetermined time, and transmit information on the determined absolute coordinates to the external electronic device, and the transmitted information on the absolute coordinates is used to determine absolute coordinates of an area in which the external electronic device is positioned by the external electronic device.

According to various embodiments, the processor (for example, the processor 120) may be further configured to change an operation mode of the electronic device (for example, the electronic device 101) to an operation mode in which the electronic device operates as a reference station in response to a user input.

According to various embodiments, the processor (for example, the processor 120) may be configured to change an operation mode of the electronic device to an operation mode in which the electronic device operates as a reference station in response to identification of the fixed state of the electronic device.

According to various embodiments, the processor (for example, the processor 120) may be configured to determine a carrier phase, based on a plurality of signals received from at least one satellite for the predetermined time, acquire information related to satellites including precise orbit information of at least one satellite and satellite clock information, and determine the absolute coordinates of the area in which the electronic device (for example, the electronic device 101) is positioned based on the carrier phase and the information related to the satellites.

According to various embodiments, the processor (for example, the processor 120) may be further configured to change the predetermined time, based on a use history of the electronic device.

According to various embodiments, the processor (for example, the processor 120) may be configured to broadcast the information on the determined absolute coordinates to transmit the information to the external electronic device (for example, the external electronic device 601).

According to various embodiments, the processor (for example, the processor 120) may be configured to identify that the external electronic device (for example, the external electronic device 601) is within a valid communication radius of the electronic device (for example, the electronic device 101) and transmit the information on the determined absolute coordinates to the external electronic device.

According to various embodiments, the processor (for example, the processor 120) may be configured to transmit the information on the determined absolute coordinates to the external electronic device, based on sameness between user account information of the external electronic device (for example, the external electronic device 601) and user account information of the electronic device (for example, the electronic device 101).

According to various embodiments, the processor (for example, the processor 120) may be further configured to transmit the information on the determined absolute coordinates to a server (for example, the server 108).

According to various embodiments, the information on the determined absolute coordinates may include RTK correction information (data).

A movable electronic device (for example, the electronic device 101) for providing location information to at least one external electronic device (for example, the external electronic device 601) according to various embodiments may include at least one sensor (for example, the sensor module 176) configured to detect motion of the electronic device, a satellite positioning circuit (for example, the GNSS communication module 210), a communication interface (for example, the communication module 190), and a processor functionally connected to the at least one sensor, the satellite positioning circuit, or the communication interface, wherein the processor is configured to identify that the electronic device is in a fixed state through the at least one sensor, identify whether the electronic device is positioned at a predetermined location through the at least one sensor, based on the identification, acquire information on absolute coordinates of an area in which the electronic device is positioned based on a plurality of signals received from satellites for a first time from timing at which it is determined that the electronic device is in the fixed state, based on identification of the predetermined location of the electronic device, acquire the information on the absolute coordinates of the area in which the electronic device is positioned based on a plurality of signals received from satellites for a second time from timing at which it is identified that the electronic device is in the fixed state, based on identification of a location of the electronic device different from the predetermined location, the second time longer than the first time, and transmit the acquired information on the absolute coordinates.

According to various embodiments, the transmitted information on the absolute coordinates may include information used to determine absolute coordinates of an area in which the external electronic device is positioned by the external electronic device (for example, the external electronic device 601).

Figure 3A:
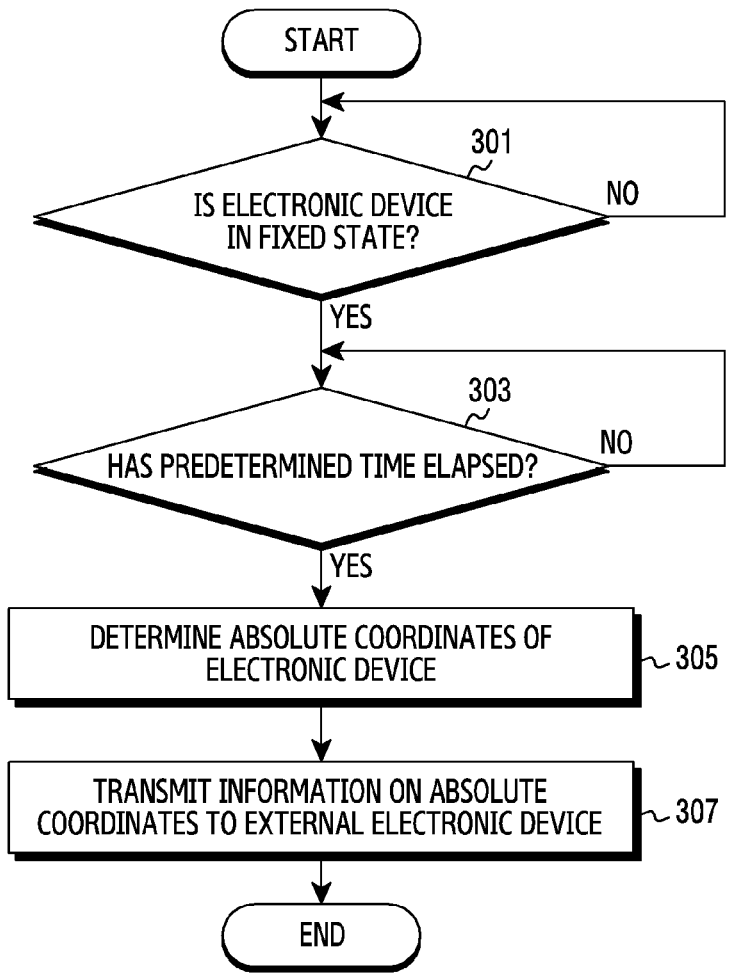
FIG. 3A illustrates an example of the operation of the electronic device according to various embodiments.

FIG. 3A illustrates an example of the operation of an electronic device according to various embodiments.

Referring to FIG. 3A, in operation 301, the processor 120 may identify whether the electronic device 101 is fixed. According to an embodiment, the electronic device 101 may correspond to a movable electronic device. For example, the electronic device 101 may be a portion of elements of means of transportation (for example, vehicles or bicycles). According to an embodiment, the electronic device 101 may include a mobile device such as a smart phone. The processor 120 may identify whether the electronic device 101 is fixed through the sensor module 176. For example, the processor 120 may identify that the electronic device 101 is fixed on the basis of identification of whether a value measured through the sensor module 176 remains for a predetermined time. In another example, when a change in the value measured through the sensor module 176 is equal to smaller than a predetermine value, the processor 120 may identify that the electronic device 101 is fixed. According to an embodiment, the processor 120 may acquire location information of the electronic device 101 acquired through the GNSS communication module 210. The processor 120 may identify whether the electronic device 101 is fixed on the basis of a use history of the electronic device 101. For example, when the electronic device 101 is a vehicle, the processor 120 may identify that the electronic device 101 is in a parking lot. The processor 120 may identify a record indicating that the electronic device 101 remains in a fixed state in a parking lot. The processor 120 may identify that the electronic device 101 is fixed on the basis of the record. According to an embodiment, the processor 120 may identify a stop state of a power device (for example, an engine) of the electronic device 101. The processor 120 may identify that the electronic device 101 is fixed on the basis of information indicating that the power device of the electronic device 101 is stopped.

If the electronic device 101 remains in the fixed state, the processor 120 may identify whether a predetermined time elapses in operation 303. According to an embodiment, the processor 120 may receive a satellite signal in response to identification that the electronic device 101 is fixed. The processor 120 may identify an intensity of a signal for each satellite according to a satellite array (constellation) through the GNSS communication module 210. If the intensity of the signal for each satellite corresponds to a predetermined size or larger, the processor 120 may make a request for satellite information. The processor 120 may receive satellite information from the satellite.

According to an embodiment, the processor 120 may determine the predetermined time on the basis of a use history of the electronic device 101. For example, the processor 120 may identify that there is a history of fixation to a predetermined location. The processor 120 may determine the predetermined time to be shorter on the basis of information indicating that the electronic device 101 is positioned at the predetermined location. According to an embodiment, the processor 120 may determine the predetermined time on the basis of a history of the operation of the electronic device 101 as a reference station. For example, the processor 120 may identify the history of the operation of the electronic device 101 as the reference station at a first location. When the electronic device 101 moves from the first location to a second location, the processor 120 may continuously identify the location of the electronic device 101. For example, the processor 120 may continuously identify the location of the electronic device by identifying whether a satellite signal remains while the electronic device 101 moves from the first location to the second location. The processor 120 may identify that the electronic device 101 remains in the fixed state at the second location. The processor 120 may estimate absolute coordinates of the second location. The processor 120 may determine the predetermined time to be shorter on the basis of the estimated absolute coordinates of the second location.

Figure 4:
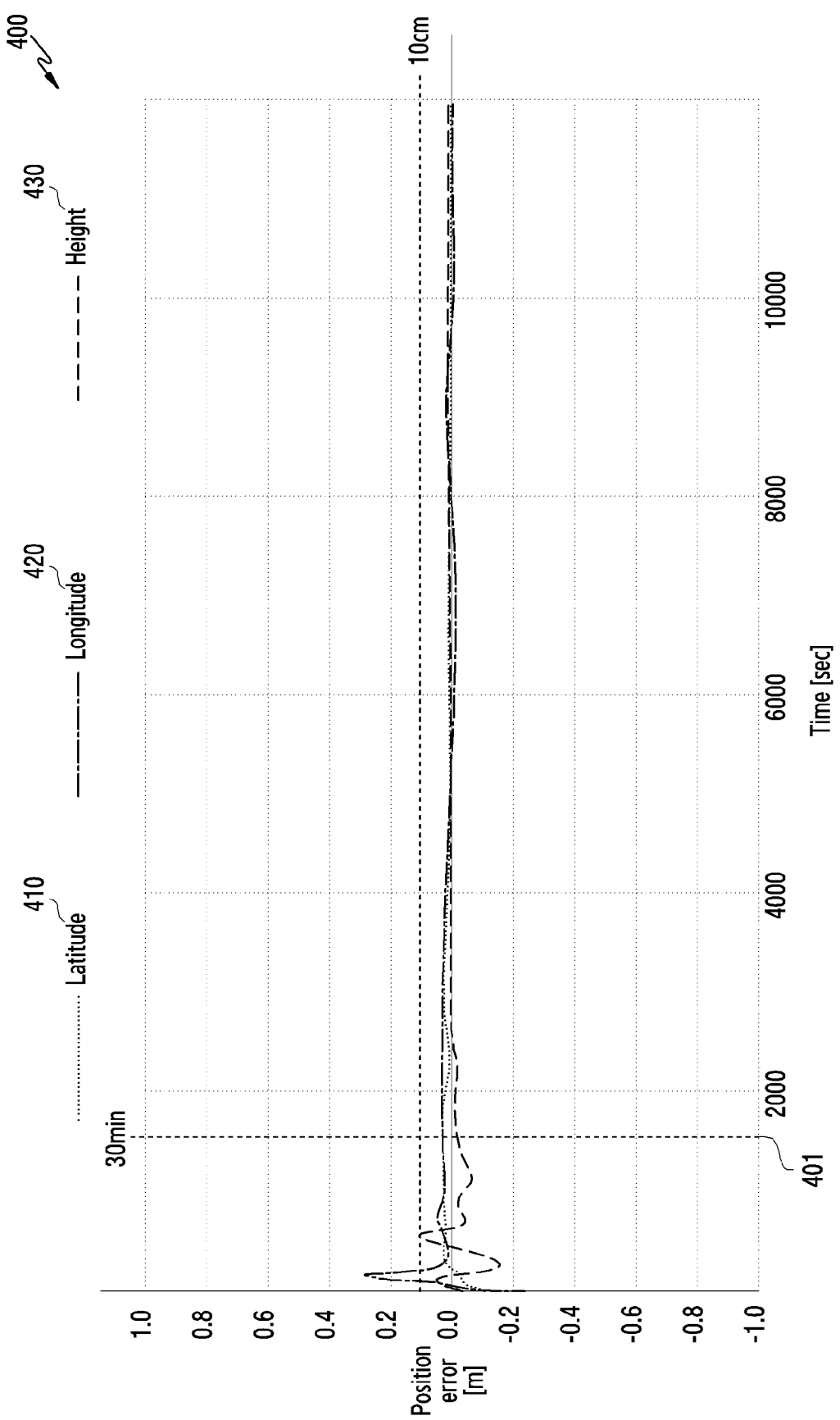
FIG. 4 illustrates a method of determining absolute coordinates of the electronic device according to various embodiments.

In operation 305, the processor 120 may determine absolute coordinates of the electronic device 101. According to an embodiment, the processor 120 may make a request for precise orbit information of at least one satellite or satellite clock information to an International GNSS Service (IGS). The processor 120 may receive precise orbit information or satellite clock information from the IGS. According to an embodiment, the processor 120 may identify information on the carrier phase on the basis of the satellite signal received from at least one satellite. The processor 120 may determine absolute coordinates of the electronic device 101 on the basis of the information on the carrier phase or the information acquired from the IGS. According to an embodiment, the processor 120 may perform ambiguity resolution by performing double differential on the information on the carrier phase. The processor 120 may determine absolute coordinates of the electronic device 101 through the ambiguity resolution. According to an embodiment, the processor 120 may determine absolute coordinates of the electronic device 101 through Precise Point Positioning (PPP). According to an embodiment, the absolute coordinates may be a location having a margin of error in units of cm from the actual location. FIG. 4 illustrates a method of determining absolute coordinates of an electronic device according to various embodiments. Referring to FIG. 4, an x axis of a graph 400 may correspond to a time at which a satellite signal is received. The unit of the x axis of the graph 400 may be [sec]. The unit of the y axis of the graph 400 may correspond to a position error. The unit of the graph 400 may be [m]. A curved line may indicate a latitude error of the electronic device 101 identified using the GNSS communication module 210. A curved line 420 may indicate a longitude error of the electronic device 101 identified using the GNSS communication module 210. A curved line 430 may indicate an altitude error of the electronic device 101 identified using the GNSS communication module 210. Before timing 401 (for example, 30 minutes) in the curved line 410 to the curved line 430, a location error may be a predetermined size (for example, about 10 cm) or larger. After the timing 401 in the curved line 410 to the curved line 430, a location error may be the predetermined size (for example, about 10 cm) or smaller. Accordingly, the processor 120 may determine that location information of the electronic device 101 measured after the timing 401 is absolute coordinates of the electronic device 101. The processor 120 may determine that the timing 401 is a predetermined time.

According to an embodiment, the processor 120 may determine absolute coordinates of the electronic device 101 on the basis of absolute coordinates of an external device received from the external device. According to an embodiment, the processor 120 may receive the absolute coordinates of the external device from the server 108. The processor 120 may determine the absolute coordinates of the electronic device 101 on the basis of the absolute coordinates of the external device. According to an embodiment, the processor 120 may receive information on the absolute coordinates of the electronic device 101 from the external device. The processor 120 may determine the absolute coordinates of the electronic device 101 on the basis of the information. For example, the processor 120 may identify that the electronic device 101 is supported by the external device. The processor 120 may receive the absolute coordinates of the external device from the external device. The processor 120 may determine that the absolute coordinates of the external device are the absolute coordinates of the electronic device 101. According to an embodiment, the absolute coordinates of the electronic device 101 may include information on latitude and longitude of the electronic device 101 or degree/minute/second coordinates of the electronic device 101.

In operation 307, the processor 120 may transmit information on the absolute coordinates to the external electronic device. The processor 120 may transmit the information on the absolute coordinates of the electronic device 101 to the external electronic device through a RTCM standard (for example, RTCM 2.1). According to an embodiment, the information on the absolute coordinates of the electronic device 101 may include at least one of RTK correction information (data), absolute coordinates of the electronic device 101, a pseudo range, or a carrier phase. According to an embodiment, the information on the absolute coordinates of the electronic device 101 may include information for determining the absolute coordinates of the external electronic device by the external electronic device. According to an embodiment, the external electronic device may include a server 108. The server 108 may transmit information on the absolute coordinates of the electronic device 101 to another external electronic device. The other electronic device may determine absolute coordinates of the other external device on the basis of the information on the absolute coordinates of the electronic device 101. According to an embodiment, the external electronic device may be an electronic device located within an effective radius of the electronic device 101.

Figure 3B:
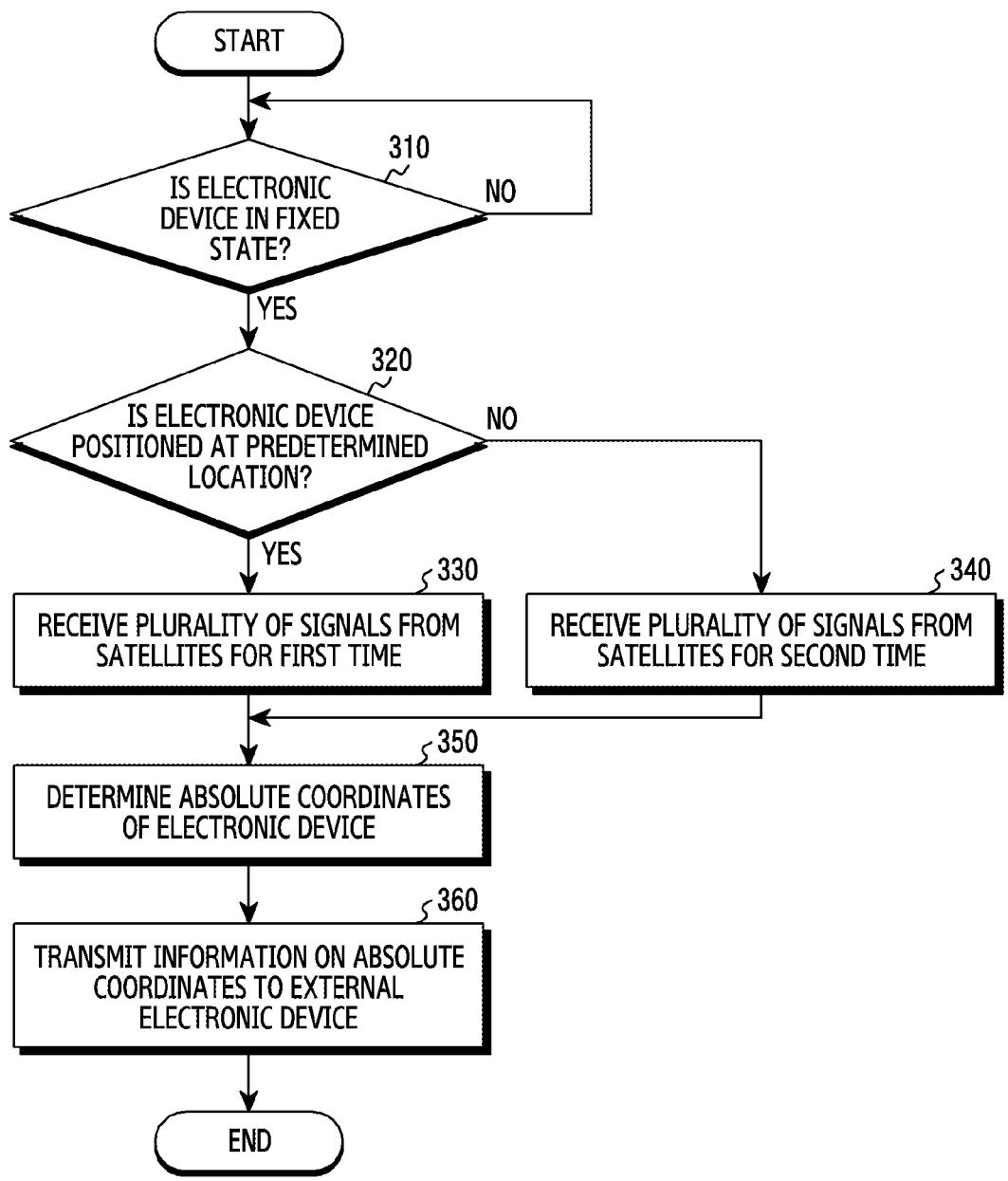
FIG. 3B illustrates another example of the operation of the electronic device according to various embodiments.

FIG. 3B illustrates another example of the operation of the electronic device according to various embodiments.

Referring to FIG. 3B, in operation 310, the processor 120 may identify whether the electronic device 101 is fixed through at least one sensor (for example, the sensor module 176). According to an embodiment, the processor 120 may identify whether the electronic device 101 is fixed on the basis of information indicating that information acquired through at least one sensor (for example, an acceleration sensor or a gyroscope) has a predetermined value. According to an embodiment, the processor 120 may identify whether the electronic device 101 is fixed on the basis of information indicating that the deviation of information acquired through at least one sensor has a predetermined value or smaller.

When the electronic device 101 is fixed in operation 320, the processor 120 may identify whether the electronic device 101 is positioned at a predetermined location through at least one sensor. According to an embodiment, the processor 120 may identify the location of the electronic device 101 on the basis of information acquired through at least one sensor (for example, an acceleration sensor, a gyroscope, or a geomagnetic sensor). The processor 120 may identify whether the electronic device 101 is positioned at a predetermined location. According to an embodiment, the processor 120 may identify absolute coordinates of the electronic device 101 before the electronic device 101 is positioned at the predetermined location. The processor 120 may identify changed coordinates on the basis of the absolute coordinates through at least one sensor of the electronic device 101. The processor 120 may identify whether the electronic device 101 is positioned at the predetermined location on the basis of the changed coordinates. For example, if the electronic device 101 corresponds to a vehicle, the processor 120 may identify whether the electronic device 101 is positioned in a parking lot through at least one sensor. In another example, if the electronic device 101 corresponds to a mobile device (for example, a smart phone), the processor 120 may identify whether the electronic device 101 is docked on a docking device (for example, a docking station or a docking audio system) positioned indoors or outdoors through at least one sensor.

In operation 330, the processor 120 may receive a plurality of signals from satellites for a first time from timing at which it is identified that the electronic device 101 is fixed on the basis of identification that the electronic device 101 is positioned at a predetermined location. According to an embodiment, the processor 120 may determine the first time on the basis of the predetermined location. For example, when the electronic device 101 is an electronic device performing a function of a bicycle, the processor 120 may identify whether the electronic device 101 is parked on a bicycle rack positioned at the predetermined location. The processor 120 may determine the first time (for example, about 15 minutes) on the basis of information indicating that the electronic device 101 is parked on the bicycle rack. The processor 120 may receive a plurality of signals from satellites for the first time from timing at which the electronic device 101 is parked on the bicycle rack. In another example, when the electronic device 101 corresponds to a mobile device, the processor 120 may determine the first time (for example, about 10 minutes) on the basis of identification of whether the electronic device 101 is docked on a docking device (for example, a docking station or a docking audio) positioned indoors or outdoors. The processor 120 may receive a plurality of signals from satellites for the first time from timing at which the electronic device 101 is docked on the docking device.

In operation 340, the processor 120 may receive a plurality of signals received from satellites for a second time, which is longer than the first time, from timing at which it is identified that the electronic device 101 is fixed on the basis of identification that the electronic device 101 is positioned at a location different from the predetermined location. According to an embodiment, the processor 120 may determine the second time on the basis of the location different from the predetermined location. For example, when the electronic device 101 is an electronic device performing a function of a bicycle, the processor 120 may identify whether the electronic device 101 is parked on another location different from a predetermined location (for example, a location of a bicycle rack). The processor 120 may determine the second time (for example, about 30 minutes) on the basis of information indicating that the electronic device 101 is positioned at the different location. The processor 120 may receive a plurality of signals from satellites for the second time from timing at which the electronic device 101 is parked on the different location. In another example, when the electronic device 101 corresponds to a mobile device, the processor 120 may identify whether the electronic device 101 is positioned at a location different from the predetermined location (for example, the location of the docking device). The processor 120 may determine the second time (for example, 20 minutes) on the basis of the information indicating that the electronic device 101 is located (for example, docked or charged) at the different location. The processor 120 may receive a plurality of signals from satellites for the second time from timing at which the electronic device 101 is parked on the different location.

In operation 350, the processor 120 may determine absolute coordinates of the electronic device 101 on the basis of the plurality of signals received from the satellites. According to an embodiment, the processor 120 may measure a carrier phase on the basis of the plurality of signals. The processor 120 may make a request for precise orbit information of at least one satellite or satellite clock information to an International GNSS Service (IGS). The processor 120 may receive precise orbit information or satellite clock information from the IGS. The processor 120 may estimate an ambiguity parameter on the basis of the carrier phase, precise orbit information, or satellite clock information. The processor 120 may determine absolute coordinates of the electronic device 101 on the basis of the estimated ambiguity parameter. The absolute coordinates of the electronic device 101 may include information on longitude and latitude or degree/minute/second coordinates of the electronic device 101.

In operation 360, the processor 120 may transmit information on the absolute coordinates of the electronic device 101 to an external electronic device. The processor 120 may transmit the information on the absolute coordinates of the electronic device 101 to the external electronic device through a RTCM standard (for example, RTCM 2.1).

According to an embodiment, the information on the absolute coordinates of the electronic device 101 may include RTK correction information (data). According to an embodiment, the information on the absolute coordinates of the electronic device 101 may include a pseudo range or a carrier phase. According to an embodiment, the information on the absolute coordinates of the electronic device 101 may correspond to information for determining absolute coordinates of the external electronic device by the external electronic device. According to an embodiment, the external electronic device may include a server 108. The server 108 may transmit the information of the absolute coordinates of the electronic device 101 to another external electronic device. The other external electronic device may determine absolute coordinates of the other external electronic device on the basis the information on the absolute coordinates of the electronic device 101 received from the server.

Figure 5:
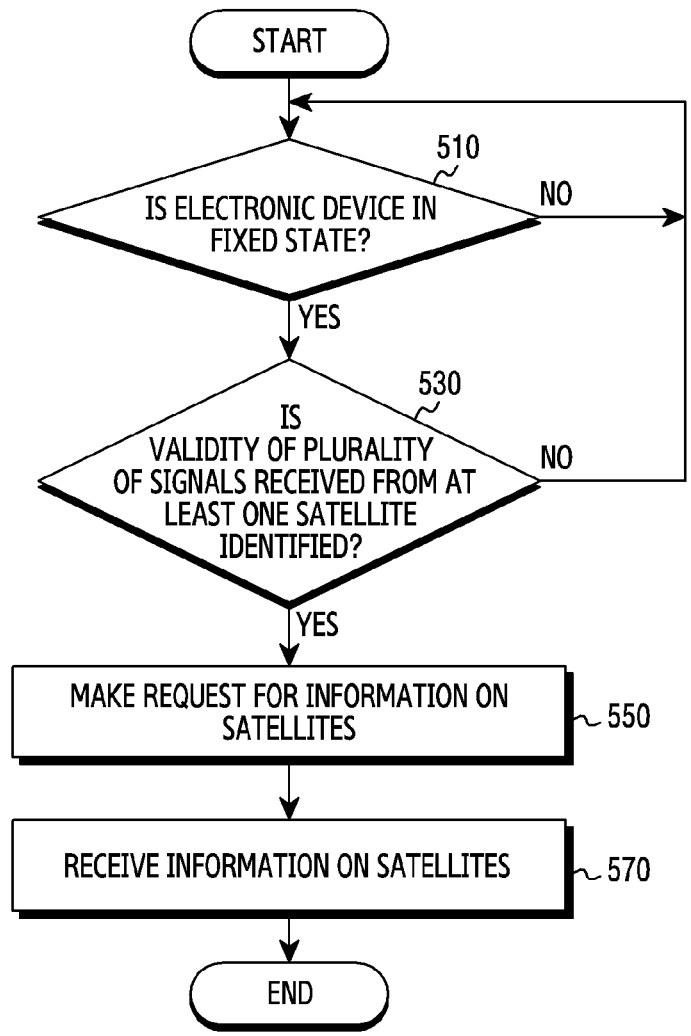
FIG. 5 illustrates an example of the operation in which the electronic device receives a satellite signal according to various embodiments.

FIG. 5 illustrates an example of the operation in which the electronic device receives a satellite signal according to various embodiments. Operations 510 to 570 of FIG. 5 may be associated with operation 301 of FIG. 3A.

In operation 510, the processor 120 may identify whether the electronic device 101 is fixed. Operation 510 may be performed similarly to operation 301 of FIG. 3A. According to an embodiment, the processor 120 may receive an input for making a request for operating as a reference station from the user of the electronic device 101. The processor 120 may change an operation mode of the electronic device 101 to an operation mode in which the electronic device 101 operates as the reference station on the basis of the input. The processor 120 may identify whether the electronic device 101 is fixed in response to the change of the operation mode of the electronic device 101 to the operation mode in which the electronic device 101 operates as the reference station.

When the electronic device 101 is fixed, the processor 120 may identify validity of a plurality of signals received from at least one satellite in operation 530. According to an embodiment, when the intensity of the plurality of signals received from at least one satellite is higher than or equal to a predetermined size, the processor 120 may identify that the signals are valid. According to an embodiment, when it is identified that the plurality of signals received from at least one satellite are not valid, the processor 120 may identify whether the electronic device 101 is fixed again. According to an embodiment, when the electronic device 101 is fixed, the processor 120 may change the operation mode of the electronic device 101 to the operation mode in which the electronic device 101 operates as the reference station. The processor 120 may identify validity of the plurality of signals received from at least one satellite in response to the change to the operation mode in which the electronic device 101 operates as the reference station.

In operation 550, the processor 120 may make a request for information on a satellite to an International GNSS service (IGS). According to an embodiment, the information on the satellite may include precise orbit information of at least one satellite or satellite clock information. According to an embodiment, the information on the satellite may include information for determining absolute coordinates of the electronic device 101.

In operation 570, the processor 120 may receive the information on the satellite from the IGS. According to an embodiment, the IGS may transmit the information on the satellite to the electronic device 101 in the form of an RTCM message (for example, RTCM3). The processor 120 may receive the information on the satellite from the IGS in the form of the RTCM message (for example, RTCM3).

According to an embodiment, the processor 120 may receive satellite signals from at least one satellite along with information on the satellites. The processor 120 may continuously receive the satellite signals from at least one satellite. The processor 120 may measure a carrier phase on the basis of the received satellite signals. The processor 120 may use the information on the carrier phase, the precise orbit information of at least one satellite received from the IGS, or the satellite clock information to determine absolute coordinates of the electronic device 101.

Figure 6:
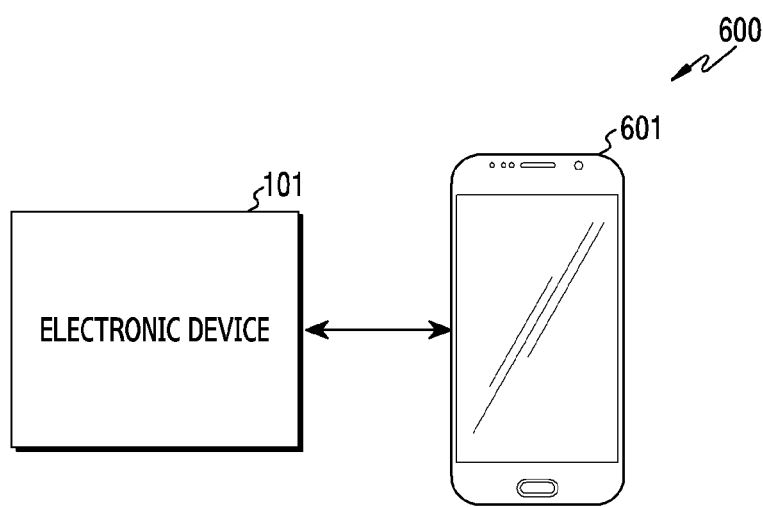
FIG. 6 illustrates an example in which the electronic device transmits information related to absolute coordinates of the electronic device to the external electronic device according to various embodiments.

FIG. 6 illustrates an example in which an electronic device transmits information related to absolute coordinates of the electronic device to an external electronic device according to various embodiments.

Referring to FIG. 6, a network environment 600 may include the electronic device 101 or an external electronic device 601. According to an embodiment, the electronic device 101 may correspond to a movable electronic device. For example, the electronic device 101 may be a portion of elements of means of transportation (for example, vehicles or bicycles). According to an embodiment, the electronic device 101 may include a mobile device such as a smart phone. According to an embodiment, the external electronic device 601 may correspond to an electronic device positioned within a valid communication radius of the electronic device 101. According to an embodiment, the electronic device 101 may establish a connection with the external electronic device 601. According to an embodiment, the electronic device 101 may establish the connection with the external electronic device 601 through various connection schemes. For example, the electronic device 101 may establish the connection with the external electronic device 601 through a wired connection (for example, a USB cable). In another example, the electronic device 101 may establish the connection with the external electronic device 601 through a wireless connection. For example, the wireless connection may include at least one of Bluetooth, Bluetooth Low Energy (BLE), or Wi-Fi direct.

According to an embodiment, the processor 120 of the electronic device 101 may receive an input for making a request for operating as a reference station from the user of the electronic device 101. The processor 120 may change an operation mode of the electronic device 101 to an operation mode in which the electronic device 101 operates as the reference station on the basis of the input.

According to an embodiment, the processor 120 of the electronic device 101 may identify whether the electronic device 101 is fixed. According to an embodiment, when the electronic device 101 is fixed, the processor 120 may change the operation mode of the electronic device 101 to the operation mode in which the electronic device 101 operates as the reference station. According to an embodiment, the processor 120 may identify whether the electronic device 101 is fixed through at least one sensor (for example, the sensor module 176) of the electronic device 101. For example, when a change in a value measured through at least one sensor of the electronic device 101 is smaller than a predetermined value, the electronic device 101 may identify that the electronic device 101 is fixed. In another example, when the electronic device 101 corresponds to a vehicle, the processor 120 may identify that the electronic device 101 is fixed on the basis of the stopped engine of the electronic device 101. In another example, when the electronic device 101 corresponds to a smart phone, the processor 120 may identify that the electronic device 101 is fixed on the basis of a state of the electronic device 101 being charged. In another example, when the electronic device 101 corresponds to a smart phone, the processor 120 may identify that the electronic device 101 is fixed on the basis of electronic device docking on a smart docking device (for example, a docking station or a docking audio system).

According to an embodiment, the processor 120 may receive satellite signals from at least one satellite on the basis of identification of the fixed state of the electronic device 101. The processor 120 may identify validity of the satellite signals received from at least one satellite.

According to an embodiment, the processor 120 may identify whether the predetermined time elapses. According to an embodiment, the processor 120 may change the predetermined time on the basis of a place in which the electronic device 101 is positioned. For example, when the electronic device 101 is a vehicle, the processor 120 may identify whether the electronic device 101 is positioned in a parking lot. The processor 120 may determine that the predetermined time is a first time (for example, about 10 minutes). The processor 120 may identify whether the electronic device 101 is positioned at another location which is not the parking lot. The processor 120 may determine that the predetermined time is a second time (for example, about 30 minutes) longer than the first time. According to an embodiment, the processor 120 may determine the predetermined time on the basis of a use history of the electronic device 101.

According to an embodiment, the processor 120 may determine a carrier phase on the basis of the satellite signals received from at least one satellite. According to an embodiment, the processor 120 may receive precise orbit information of at least one satellite and satellite clock information to the IGS. According to an embodiment, the processor 120 may determine absolute coordinates of the electronic device 101 on the basis of the carrier phase, the precise orbit information of at least one satellite, or the satellite clock information.

According to an embodiment, the processor 120 may transmit information on the absolute coordinates of the electronic device 101 to the external electronic device 601. According to an embodiment, the information on the absolute coordinates of the electronic device 101 may include RTK correction information (data). According to an embodiment, the information on the absolute coordinates of the electronic device 101 may include a pseudo range or a carrier phase.

According to an embodiment, the external electronic device 601 may determine absolute coordinates of the external electronic device 601 on the basis of information on the absolute coordinates of the electronic device 101 received from the electronic device 101. The external electronic device 601 may provide various pieces of content on the basis of the absolute coordinates of the external electronic device 601. For example, the electronic device 101 may be a vehicle, and the external electronic device 601 may be a portable terminal. When the user of the electronic device 101 starts the parked electronic device 101 (vehicle), the electronic device 101 may transmit information related to absolute coordinates of the electronic device 101 to the external electronic device 601 connected to the electronic device 101. The external electronic device 601 may receive information related to absolute coordinates of the electronic device 101 from the electronic device 101. The external electronic device 601 may determine absolute coordinates of the external electronic device 601 on the basis of information related to the electronic device 101. The external electronic device 601 may provide the user with information on a navigation device and weather at the current location on the basis of the absolute coordinates of the external electronic device 601.

Figure 7:
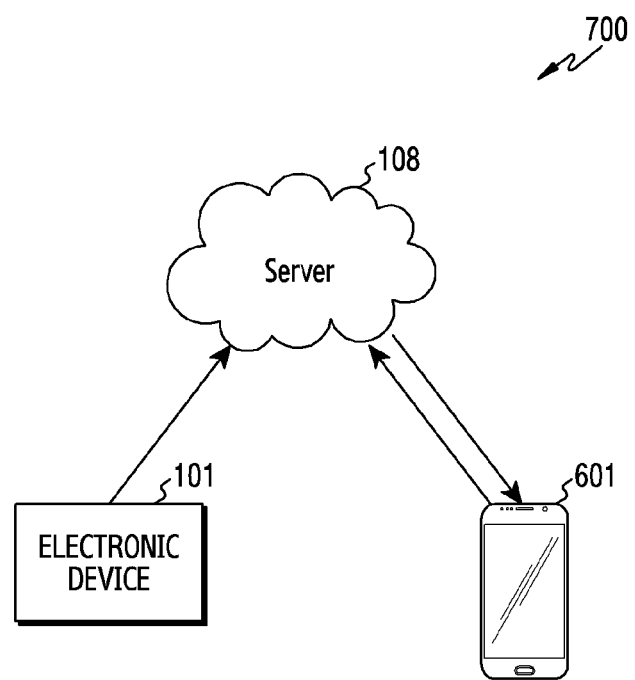
FIG. 7 illustrates another example in which the electronic device transmits information related to absolute coordinates of the electronic device to the external electronic device according to various embodiments.

FIG. 7 illustrates another example in which an electronic device transmits information related to absolute coordinates of the electronic device to an external electronic device according to various embodiments.

Referring to FIG. 7, a network environment 700 may include the electronic device 101, the external electronic device 601, or the server 108. According to an embodiment, the electronic device 101 may correspond to a movable electronic device. For example, the electronic device 101 may be a portion of elements of means of transportation (for example, vehicles or bicycles). According to an embodiment, the electronic device 101 may include a mobile device such as a smart phone. According to an embodiment, the electronic device 101 or the external electronic device 601 may correspond to an electronic device positioned within a valid communication radius of the server 108. According to an embodiment, the electronic device 101 may establish a connection with the server 108. According to an embodiment, the server 108 may establish a connection with the external electronic device 601. According to an embodiment, the electronic device 101 and the server 108 or the server 108 and the external electronic device 601 may establish the connection through various connection schemes. The electronic device 101 and the server 108 or the server 108 and the external electronic device 601 may establish the connection through a wireless connection. For example, the wireless connection may include a cellular network (for example, 5G (fifth generation mobile communication) or Long Term Evolution (LTE)). According to an embodiment, the server 108 may transmit information to the external electronic device 601 by broadcasting a Digital Multimedia Broadcasting (DMB) signal without establishing the connection with the external electronic device 601.

According to an embodiment, the processor 120 of the electronic device 101 may determine absolute coordinates of the electronic device 101. The operation in which the processor 120 determines absolute coordinates of the electronic device 101 may be performed similarly to the operation illustrated in FIGS. 3A to 3B.

According to an embodiment, the processor 120 may upload information on the absolute coordinates of the electronic device 101 to the server 108. According to an embodiment, the information on the absolute coordinates of the electronic device 101 may include RTK correction information (data). According to an embodiment, the information on the absolute coordinates of the electronic device 101 may not indicate absolute coordinates of the electronic device 101 after a predetermined time. The information on the absolute coordinates of the electronic device 101 may have an expiration date. The information on the absolute coordinates of the electronic device 101 may be discarded after the expiration date. The processor 120 may transmit information on the absolute coordinates to the server 108 according to a predetermined time period.

According to an embodiment, the server 108 may be a server (for example, a multi edge computing (MEC) server) connected to a base station. According to an embodiment, the server 108 may store information on the absolute coordinates of the electronic device 101 through the electronic device 101. According to an embodiment, the server 108 may periodically receive information on the absolute coordinates of the electronic device 101 and update the information. According to an embodiment, the server 108 may manage account information of the user of the electronic device 101. The server 108 may transmit information on the absolute coordinates of the electronic device 101 to the external electronic device 601 having a registered account which is the same as the account information of the user of the electronic device 101.

According to an embodiment, the external electronic device 601 may make a request for information on the absolute coordinates of the electronic device 101 to the server 108. The server 108 may identify information on the absolute coordinates of the electronic device 101 having the account which is the same as the account information of the external electronic device 601. The information on the absolute coordinates of the electronic device 101 may be periodically transmitted from the electronic device 101 and updated. The server 108 may transmit information on the absolute coordinates of the electronic device 101 stored in the server 108 to the external electronic device 601 in response to a request for information on the absolute coordinates of the electronic device 101 from the external electronic device 601. The external electronic device 601 may receive the information on the absolute coordinates of the electronic device 101 from the server 108. The external electronic device 601 may determine absolute coordinates of the external electronic device 601 on the basis of the information on the absolute coordinates of the electronic device 101.

Figure 8:
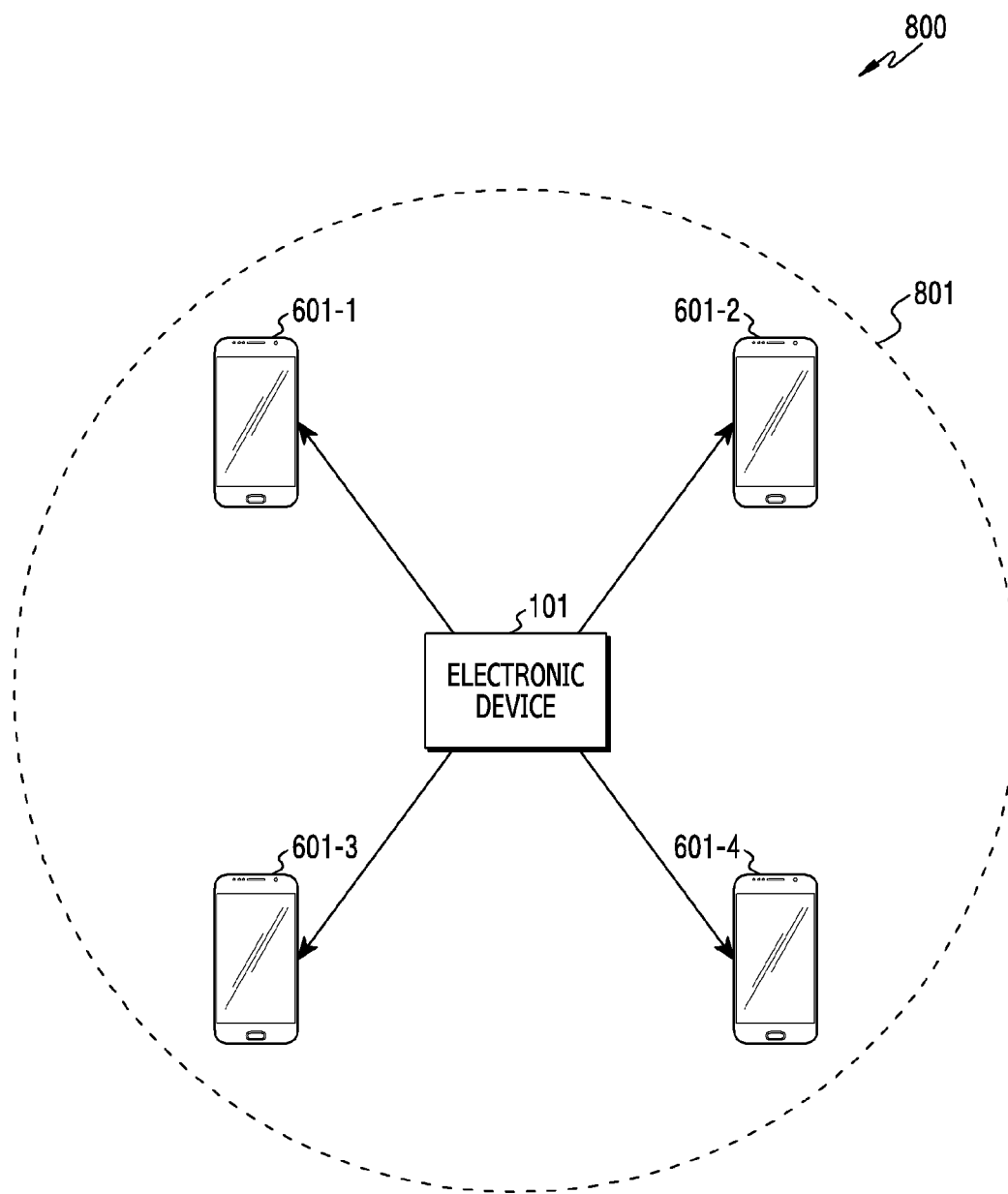
FIG. 8 illustrates another example in which the electronic device transmits information related to absolute coordinates of the electronic device to the external electronic device according to various embodiments.

FIG. 8 illustrates another example in which an electronic device transmits information related to absolute coordinates of the electronic device to an external electronic device according to various embodiments.

Referring to FIG. 8, a network environment 800 may include the electronic device 101, an external electronic device 601-1, an external electronic device 601-2, an external electronic device 601-3, or an external electronic device 601-4. The external electronic device 601-1 to the external electronic device 601-4 are illustrated in the form of a portable terminal in FIG. 8, but are not limited thereto. Each of the external electronic device 601-1 to the external electronic device 601-4 may correspond to one of at least one electronic device using its own location information. According to an embodiment, the electronic device 101 may correspond to a movable electronic device. For example, the electronic device 101 may be a portion of elements of means of transportation (for example, vehicles or bicycles). According to an embodiment, the electronic device 101 may include a mobile device such as a smart phone. According to an embodiment, the external electronic device 601-1 to the external electronic device 601-4 may correspond to electronic devices positioned within a valid communication radius 801 of the electronic device 101.

According to an embodiment, the processor 120 of the electronic device 101 may determine absolute coordinates of the electronic device 101. The operation in which the processor 120 determines absolute coordinates of the electronic device 101 may be performed similarly to the operation illustrated in FIGS. 3A to 3B.

According to an embodiment, the electronic device 101 may establish connections with the external electronic device 601-1 to the external electronic device 601-4. The electronic device 101 may transmit information on absolute coordinates of the electronic device 101 to the external electronic device 601-1 to the external electronic device 601-4 in response to a request for information on the absolute coordinates of the electronic device 101 from the external electronic device 601-1 to the external electronic device 601-4. The external electronic device 601-1 to the external electronic device 601-4 may determine absolute coordinates of the external electronic device 601-1 to the external electronic device 601-4 on the basis of the information on the absolute coordinates of the electronic device 101. According to an embodiment, the electronic device 101 and the external electronic device 601-1 to the external electronic device 601-4 may transmit and receive signals through the same communication method. According to an embodiment, the external electronic device 601-1 to the external electronic device 601-4 may transmit and receive signals through different communication methods. For example, the electronic device 101 and the external electronic device 601-1 may transmit and receive signals through LTE communication. The electronic device 101 and the external electronic device 601-2 may transmit and receive signals through a wire (for example, a USB cable). The electronic device 101 and the external electronic device 601-3 may transmit and receive signals through 5G communication. The electronic device 101 and the external electronic device 601-4 may transmit and receive signals through Bluetooth.

According to an embodiment, the processor 120 of the electronic device 101 may broadcast information on the absolute coordinates of the electronic device 101 without establishing the connections with the external electronic device 601-1 to the external electronic device 601-4. The external electronic device 601-1 to the external electronic device 601-4 may receive information on the absolute coordinates of the electronic device 101 broadcasted from the electronic device 101. For example, the processor 120 of the electronic device 101 may broadcast information on the absolute coordinates of the electronic device 101 through a DMB signal. The external electronic device 601-1 to the external electronic device 601-4 may receive the DMB signal and acquire information on the absolute coordinates of the electronic device 101. According to an embodiment, the external electronic device 601-1 to the external electronic device 601-4 may determine their own absolute coordinates on the basis of the information on the absolute coordinates of the electronic device 101.

According to an embodiment, the processor 120 of the electronic device 101 may establish a communication connection with some of the external electronic device 601-1 to the external electronic device 601-4. The remaining electronic devices of the external electronic device 601-1 to the external electronic device 601-4, which have no communication connection, may be electronic devices (or conditions) which cannot make the communication connection with the electronic device 101. The processor 120 may transmit a signal about the absolute coordinates of the electronic device 101 through the communication connection to some of the external electronic device 601-1 to the external electronic device 601-4 having the communication connection with the electronic device 101. The processor 120 may broadcast the information on the absolute coordinates of the electronic device 101 without to the remaining external electronic devices of the external electronic device 601-1 to the external electronic device 601-4 which have no communication connection with the electronic device 101.

According to an embodiment, the electronic device 101 may be selected as an electronic device which operates as a reference station by the user among a plurality of electronic devices (for example, the electronic device 101, the external electronic device 601-1, the external electronic device 601-2, the external electronic device 601-3, or the external electronic device 601-4). The processor 120 of the electronic device 101 may change the operation mode of the electronic device 101 to the operation mode in which the electronic device 101 operates as the reference station on the basis of the user's selection. The processor 120 may transmit information on the absolute coordinates of the electronic device 101 to the external electronic device 601-1 to the external electronic device 601-4.

According to an embodiment, the electronic device 101 may be an electronic device which is in the fixed state for a predetermined time among a plurality of electronic devices (for example, the electronic device 101, the external electronic device 601-1, the external electronic device 601-2, the external electronic device 601-3, or the external electronic device 601-4). The processor 120 may change the operation mode of the electronic device 101 to the operation mode in which the electronic device 101 operates as the reference station in response to the fixed state maintained for the predetermined time. The processor 120 may transmit information on the absolute coordinates of the electronic device 101 to the external electronic device 601-1 to the external electronic device 601-4 on the basis of the change of the operation mode of the electronic device 101 to the operation mode in which the electronic device 101 operates as the reference station.

Figure 9:
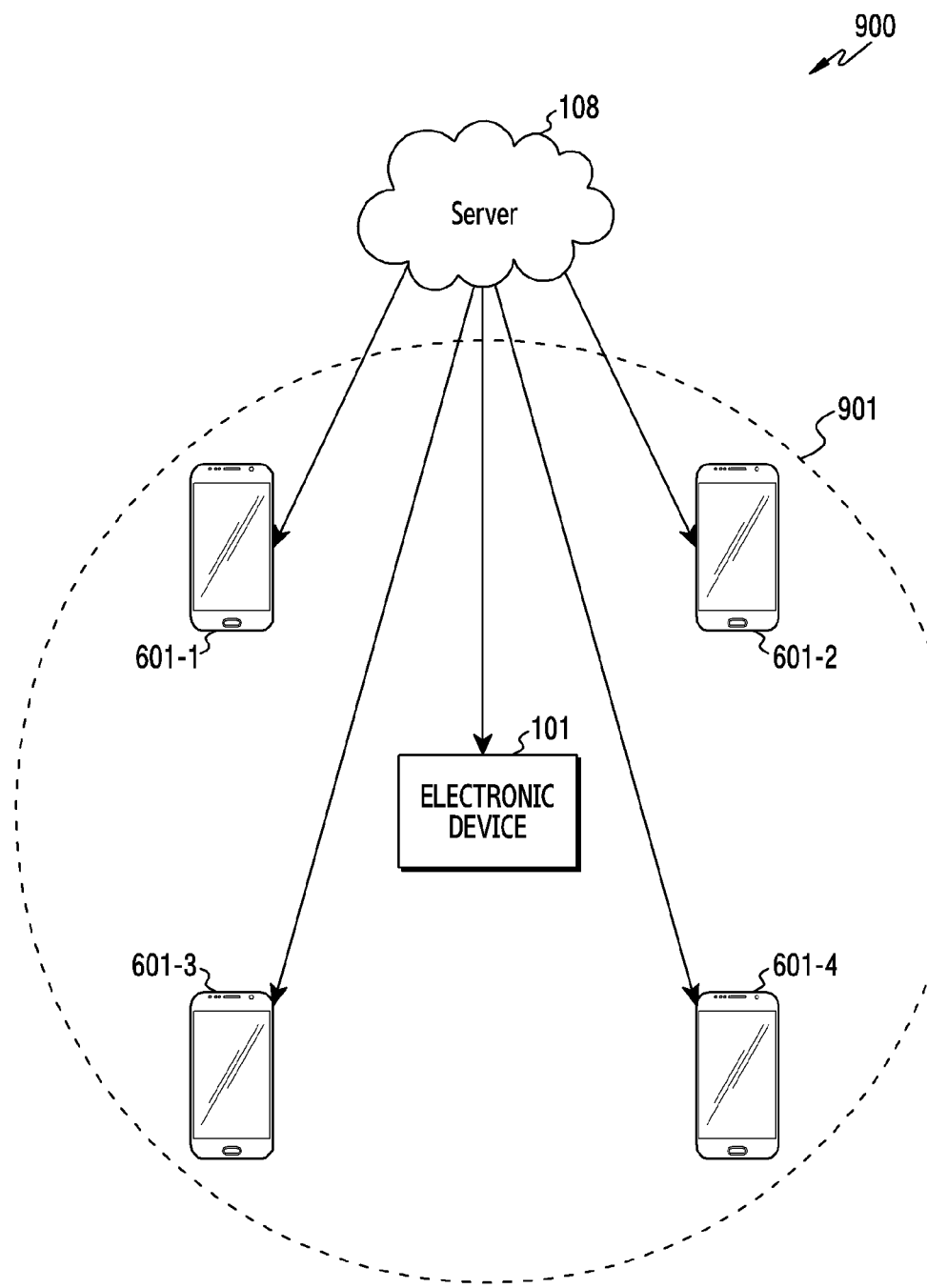
FIG. 9 illustrates another example in which the electronic device transmits information related to absolute coordinates of the electronic device to the external electronic device according to various embodiments.

FIG. 9 illustrates another example in which an electronic device transmits information related to absolute coordinates of the electronic device to an external electronic device according to various embodiments.

Referring to FIG. 9, a network environment 900 may include the electronic device 101, the server 108, the external electronic device 601-1, the external electronic device 601-2, the external electronic device 601-3, or the external electronic device 601-4. The external electronic device 601-1 to the external electronic device 601-4 are illustrated in the form of a portable terminal in FIG. 9, but are not limited thereto. Each of the external electronic device 601-1 to the external electronic device 601-4 may correspond to one of at least one electronic device using its own location information. According to an embodiment, the electronic device 101 may correspond to a movable electronic device. For example, the electronic device 101 may be a portion of elements of means of transportation (for example, vehicles or cycles). According to an embodiment, the electronic device 101 may include a mobile device such as a smart phone. According to an embodiment, the external electronic device 601-1 to the external electronic device 601-4 may correspond to electronic devices positioned within a valid communication radius 901 of the electronic device 101.

According to an embodiment, the processor 120 of the electronic device 101 may determine absolute coordinates of the electronic device 101. The operation in which the processor 120 determines absolute coordinates of the electronic device 101 may be performed similarly to the operation illustrated in FIGS. 3A to 3B. According to an embodiment, the server 108 may operate similarly to the server 108 of FIG. 7.

According to an embodiment, the external electronic device 601-1 to the external electronic device 601-4 may make a request for RTK correction information (information on absolute coordinates of the electronic device 101) to the server 108. The server 108 may identify the electronic device 101 having a valid radius including the external electronic device 601-1 to the external electronic device 601-4 on the basis of the request. The server 108 may transmit the RTK correction information (for example, the information on the absolute coordinates of the electronic device 101) received from the electronic device 101 to each of the external electronic device 601-1 to the external electronic device 601-4 on the basis of the identification. The external electronic device 601-1 to the external electronic device 601-4 may determine absolute coordinates of the external electronic device 601-1 to the external electronic device 601-4 on the basis of the received information.

According to an embodiment, the electronic device 101 may be selected as an electronic device which operates as a reference station by the user among a plurality of electronic devices (for example, the electronic device 101, the external electronic device 601-1, the external electronic device 601-2, the external electronic device 601-3, or the external electronic device 601-4). The processor 120 of the electronic device 101 may change the operation mode of the electronic device 101 to the operation mode in which the electronic device 101 operates as the reference station on the basis of the user's selection. The processor 120 may transmit information on the absolute coordinates of the electronic device 101 to the server 108. According to an embodiment, the information on the absolute coordinates of the electronic device 101 may not indicate absolute coordinates of the electronic device 101 after a predetermined time. The information on the absolute coordinates of the electronic device 101 may have an expiration date. The information on the absolute coordinates of the electronic device 101 may be discarded after an expiration date. The processor 120 may transmit the information on the absolute coordinates of the electronic device 101 to the server 108 according to a predetermined time period.

According to an embodiment, the server 108 may manage account information of the electronic device 101. The server 108 may transmit information on the absolute coordinates of the electronic device 101 to external electronic devices (for example, the external electronic device 601-1 to the external electronic device 601-4) on the basis of the account information of the electronic device 101. For example, the server 108 may receive a signal making a request for RTK correction information from the external electronic device 601-1. The server 108 may identify the account information of the external electronic device 601-1 and that the external electronic device 601 is positioned within a valid communication radius 901 of the electronic device 101. The server 108 may identify that the information of the absolute coordinates of the electronic device 101 is needed to determine the absolute coordinates of the external electronic device 601. The server 108 may transmit the information on the absolute coordinates of the electronic device 101 stored in the server 108 to the external electronic device 601-1. The information on the absolute coordinates of the electronic device 101 may include RTK correction information. The external electronic device 601-1 may determine absolute coordinates of the external electronic device 601-1 on the basis of the information received from the server 108.

Figure 10:
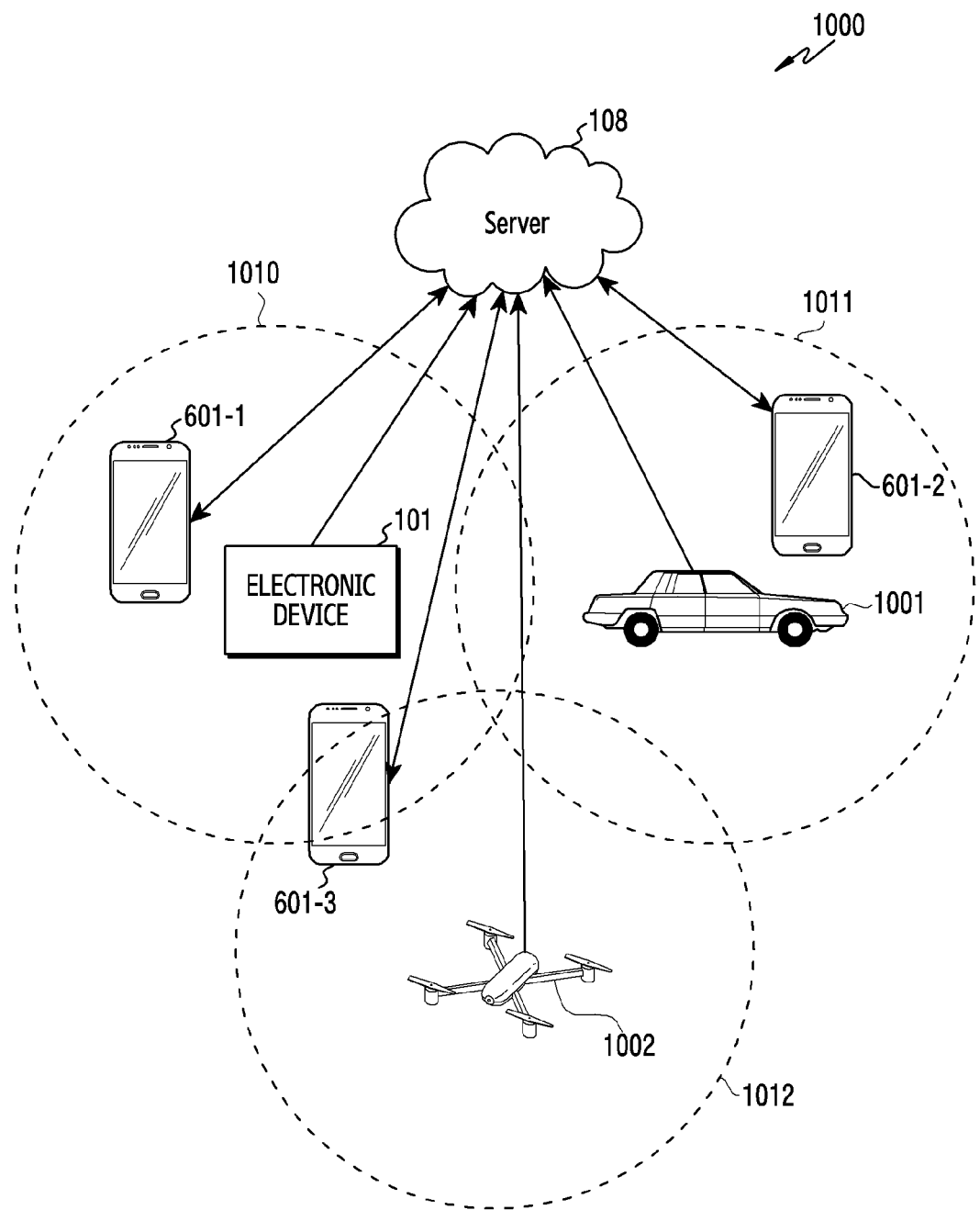
FIG. 10 illustrates another example in which the electronic device transmits information related to absolute coordinates of the electronic device to the external electronic device according to various embodiments.

FIG. 10 illustrates another example in which an electronic device transmits information related to absolute coordinates of the electronic device to an external electronic device according to various embodiments.

Referring to FIG. 10, a network environment 1000 includes the electronic device 101, the server 108, the external electronic device 601-1, the external electronic device 601-2, the external electronic device 601-3, a first device 1001, or a second device 1002. The external electronic device 601-1 to the external electronic device 601-3 are illustrated in the form of a portable terminal in FIG. 10, but are not limited thereto. Each of the external electronic device 601-1 to the external electronic device 601-3 may correspond to one of at least one electronic device using its own location information. According to an embodiment, the electronic device 101, the first device 1001, or the second device 1002 may correspond to a movable electronic device. For example, the electronic device 101 may be a portion of elements of means of transportation (for example, vehicles or cycles). According to an embodiment, the electronic device 101 may include a mobile device such as a smart phone.

According to an embodiment, the external electronic device 601-1 and the external electronic device 601-3 may correspond to electronic devices positioned with a valid communication radius 1010 of the electronic device 101. The external electronic device 601-2 may correspond to an electronic device positioned within a valid communication radius 1011 of the first device 1001. The external electronic device 601-3 may correspond to an electronic device positioned within a valid communication radius 1012 of the second device 1002.

According to an embodiment, the processor 120 of the electronic device 101 may determine absolute coordinates of the electronic device 101. The operation in which the processor 120 determines absolute coordinates of the electronic device 101 may be performed similarly to the operation illustrated in FIGS. 3A to 3B. According to an embodiment, the server 108 may operate similarly to the server 108 of FIG. 7. According to an embodiment, the first device 1001 or the second device 1002 may operate similarly to the electronic device 101.

According to an embodiment, the processor 120 may periodically transmit information on the absolute coordinates of the electronic device 101 to the server 108. The first device 1001 may periodically transmit information on the absolute coordinates of the first device 1001 to the server 108. The second device 1002 may periodically transmit information on the absolute coordinates of the second device 1002 to the server 108. The server 108 may store the information on the absolute coordinates of the electronic device 101, the first device 1001 or the second device 1002.

According to an embodiment, the external electronic device 601-1 may make a request for RTK correction information (for example, the information on absolute coordinates of the electronic device 101) to the server 108. The server 108 may identify that the external electronic device 601-1 is positioned within a valid communication radius 1010 of the electronic device 101. The server 108 may transmit the RTK correction information (for example, the information on the absolute coordinates of the electronic device 101) to the external electronic device 601-1. The external electronic device 601-1 may identify absolute coordinates of the external electronic device 601-1 on the basis of the RTK correction information received from the server. According to an embodiment, the external electronic device 601-2 may make a request for RTK correction information (for example, the information on the absolute coordinates of the first device 1001) to the server 108. The server 108 may identify that the external electronic device 601-2 is positioned with the valid communication radius 1011 of the first device 1001. The server 108 may transmit the RTK correction information (for example, the information on the absolute coordinates of the first device 1001) to the external electronic device 601-2. The external electronic device 601-2 may identify absolute coordinates of the external electronic device 601-2 on the basis of the RTK correction information received from the server.

According to an embodiment, the determined absolute coordinates of the external electronic devices (for example, the external electronic device 601-1 to the external electronic device 601-3) may have larger margin of error as being further away from the valid communication radius of the electronic device (for example, the electronic device 101, the first device 1001, or the second device 1002). The external electronic devices may determine the absolute coordinates of the external electronic devices on the basis of the absolute coordinates of a plurality of electronic devices. For example, the external electronic devices (for example, the external electronic device 601-1 to the external electronic device 601-3) may determine absolute coordinates of the external electronic devices on the basis of the absolute coordinates of each of the plurality of electronic devices. For example, the external electronic device 601-3 may make a request for RTK correction information to the server 108. The server 108 may identify that the external electronic device 601-3 is positioned outside the valid communication radius 1011 of the electronic device 101. The server 108 may identify that the external electronic device 601-3 is positioned outside the valid communication radius 1012 of the second device 1002. The server 108 may transmit information on absolute coordinates of the electronic device 101 and information on absolute coordinates of the second device 1002 to the external electronic device 601-3. The external electronic device 601-3 may determine absolute coordinates of the external electronic device 601-3 on the basis of the information on the absolute coordinates of the electronic device 101 and the information on the absolute coordinates of the second device 1002.

The external electronic device 601-3 may transmit information on the absolute coordinates of the external electronic device 601-3 to the server 108. The server 108 may determine that the second device 1002 is a virtual reference station. The second device 1002 may operate as the virtual reference station and thus allow a plurality of electronic devices to determine accurate absolute coordinates.

A method by a movable electronic device (for example, the electronic device 101) for providing location information to an external electronic device (for example, the external electronic device 601) according to various embodiments may include: an operation of identifying that the electronic device is in a fixed state through the at least one sensor (for example, the sensor module 176), an operation of identifying whether a predetermined time elapses from the identification, based on the identification, an operation of determining absolute coordinates of an area in which the electronic device is positioned using a plurality of signals received from at least one satellite for the predetermined time from the identification, based on identification of the elapse of the predetermined time, and an operation of transmitting information on the determined absolute coordinates to the external electronic device, wherein the transmitted information on the absolute coordinates is used to determine absolute coordinates of an area in which the external electronic device is positioned by the external electronic device.

According to various embodiments, the method by the movable electronic device (for example, the electronic device 101) for providing location information to the external electronic device (for example, the external electronic device 601) may further include an operation of changing an operation mode of the electronic device to an operation mode in which the electronic device operates as a reference station in response to a user input.

According to various embodiments, the operation of identifying whether the predetermined time elapses from the identification may include an operation of changing an operation mode of the electronic device to an operation mode in which the electronic device operates as a reference station in response to identification of the fixed state of the electronic device (for example, the electronic device 101) and an operation of identifying whether the predetermined time elapses from the identification.

According to various embodiments, the operation of determining the absolute coordinates of the area in which the electronic device (for example, the electronic device 101) is positioned may include an operation of determining a carrier phase, based on a plurality of signals received from at least one satellite for the predetermined time, an operation of acquiring information related to satellites including precise orbit information of at least one satellite and satellite clock information, and an operation of determining the absolute coordinates of the area in which the electronic device is positioned based on the carrier phase and the information related to the satellites.

According to various embodiments, the method by the movable electronic device (for example, the electronic device 101) for providing location information to the external electronic device (for example, the external electronic device 601) may further include an operation of changing the predetermined time, based on a use history of the electronic device.

According to various embodiments, the operation of transmitting the information on the determined absolute coordinates to the external electronic device (for example, the external electronic device 601) may include an operation of broadcasting the information on the determined absolute coordinates to transmit the information to the external electronic device.

According to various embodiments, the operation of transmitting the information on the determined absolute coordinates to the external electronic device (for example, the external electronic device 601) may include an operation of identifying that the external electronic device is within a valid communication radius of the electronic device (for example, the electronic device 101) by the external electronic device, and an operation of transmitting the information on the determined absolute coordinates to the external electronic device.

According to various embodiments, the method by the movable electronic device (for example, the electronic device 101) for providing location information to the external electronic device (for example, the external electronic device 601) may further include an operation of transmitting the information on the determined absolute coordinates to a server (for example, the server 108).

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device for providing location information to an external electronic device, the electronic device comprising:
   a sensor configured to detect motion of the electronic device;
   a satellite-positioning circuit;

a communication interface; and a processor functionally connected to the sensor, the satellite-positioning circuit, or the communication interface, the processor configured to:

identify that the electronic device is in a fixed state, identify whether a predetermined time elapses from the identification based on the identification the electronic device is in the fixed state, wherein the predetermined time is determined based on whether the electronic device is positioned at a predetermined location, determine absolute coordinates of an area in which the electronic device positioned using a plurality of signals received from at least one satellite for the predetermined time from the identification based on the identification of the elapse of the predetermined time, and control the communication interface to transmit information on the determined absolute coordinates to the external electronic device, wherein the transmitted information on the absolute coordinates is used to determine absolute coordinates of an area in which the external electronic device is positioned by the external electronic device.

2. The electronic device of claim 1, wherein the processor is further configured to change an operation mode of the electronic device to an operation mode in which the electronic device operates as a reference station in response to a user input.

3. The electronic device of claim 1, wherein the processor is configured to change an operation mode of the electronic device to an operation mode in which the electronic device operates as a reference station in response to identification of the fixed state of the electronic device.

4. The electronic device of claim 1, wherein the processor is configured to:

determine a carrier phase based on a plurality of signals received from at least one satellite for the predetermined time;

acquire information related to satellites including precise orbit information of at least one satellite and satellite clock information; and determine the absolute coordinates of the area in which the electronic device is positioned based on the carrier phase and the information related to the satellites.

5. The electronic device of claim 1, wherein the processor is further configured to change the predetermined time based on a use history of the electronic device.

6. The electronic device of claim 1, wherein the processor is configured to broadcast the information on the determined absolute coordinates to control the communication interface to transmit the information to the external electronic device.

7. The electronic device of claim 1, wherein the processor is configured to:

identify that the external electronic device is within a valid communication radius of the electronic device; and control the communication interface to transmit the information on the determined absolute coordinates to the external electronic device.

8. The electronic device of claim 1, wherein the processor is configured to control the communication interface to transmit the information on the determined absolute coordinates to the external electronic device based on sameness between user account information of the external electronic device and user account information of the electronic device.

9. The electronic device of claim 1, wherein the processor is further configured to control the communication interface to transmit the information on the determined absolute coordinates to a server.

10. The electronic device of claim 1, wherein the information on the determined absolute coordinates comprises RTK correction information (data).

11. An electronic device for providing location information to an external electronic device, the electronic device comprising:

a sensor configured to detect motion of the electronic device;

a satellite positioning circuit;

a communication interface; and a processor functionally connected to the sensor, the satellite positioning circuit, or the communication interface, the processor configured to:

identify that the electronic device is in a fixed state through the sensor, identify whether the electronic device is positioned at a predetermined location through the sensor based on the identification the electronic device is in the fixed state, acquire information on absolute coordinates of an area in which the electronic device is positioned based on a plurality of signals received from satellites for a first time from timing at which it is determined that the electronic device is in the fixed state based on identification of the predetermined location of the electronic device, acquire the information on the absolute coordinates of the area in which the electronic device is positioned based on a plurality of signals received from satellites for a second time, which is longer than the first time, from timing at which it is identified that the electronic device is in the fixed state, based on identification of a location of the electronic device different from the predetermined location, and control the communication interface to transmit the acquired information on the absolute coordinates.

12. The electronic device of claim 11, wherein the transmitted information on the absolute coordinates comprises information used to determine absolute coordinates of an area in which the external electronic device is positioned by the external electronic device.

13. A method by an electronic device for providing location information to an external electronic device, the method comprising:

identifying that the electronic device is in a fixed state through a sensor;

identifying whether a predetermined time elapses from the identification based on the identification that the electronic device is in the fixed state, wherein the predetermined time is determined based on whether the electronic device is positioned at a predetermined location;

determining absolute coordinates of an area in which the electronic device is positioned using a plurality of signals received from at least one satellite for the predetermined time from the identification based on identification of the elapse of the predetermined time; and transmitting information on the determined absolute coordinates to the external electronic device, wherein the transmitted information on the absolute coordinates is used to determine absolute coordinates of an area in which the external electronic device is positioned by the external electronic device.

14. The method of claim 13, further comprising changing an operation mode of the electronic device to an operation mode in which the electronic device operates as a reference station in response to a user input.

15. The method of claim 13, wherein the identifying of whether the predetermined time elapses from the identification comprises:
- changing an operation mode of the electronic device to an operation mode in which the electronic device operates as a reference station in response to identification of the fixed state of the electronic device; and
- identifying whether the predetermined time elapses from the identification.

16. The method of claim 13, wherein the determining of the absolute coordinates of the area in which the electronic device is positioned comprises:
- determining a carrier phase, based on a plurality of signals received from at least one satellite for the predetermined time;
- acquiring information related to satellites including precise orbit information of at least one satellite and satellite clock information; and
- determining the absolute coordinates of the area in which the electronic device is positioned based on the carrier phase and the information related to the satellites.

17. The method of claim 13, further comprising changing the predetermined time based on a use history of the electronic device.

18. The method of claim 13, wherein the transmitting of the information on the determined absolute coordinates to the external electronic device comprises broadcasting the information on the determined absolute coordinates to transmit the information to the external electronic device.

19. The method of claim 13, wherein the transmitting of the information on the determined absolute coordinates to the external electronic device comprises:
- identifying that the external electronic device is within a valid communication radius of the electronic device by the external electronic device; and
- transmitting the information on the determined absolute coordinates to the external electronic device.

20. The method of claim 13, further comprising transmitting the information on the determined absolute coordinates to a server.

* * * * *